Dec. 15, 1964 D. R. VON RECKLINGHAUSEN 3,161,727

STEREOPHONIC-TO-MONOPHONIC RECEPTION APPARATUS

Filed May 17, 1962

INVENTOR
DANIEL R. VONRECKLINGHAUSEN

BY Rines and Rines

ATTORNEYS

United States Patent Office 3,161,727 Patented Dec. 15, 1964

3,161,727
STEREOPHONIC-TO-MONOPHONIC RECEPTION APPARATUS

Daniel R. von Recklinghausen, Arlington, Mass., assignor to H. H. Scott, Inc., Maynard, Mass., a corporation of Massachusetts Filed May 17, 1962, Ser. No. 195,556
11 Claims. (Cl. 179—15)

Figures 1, 2:
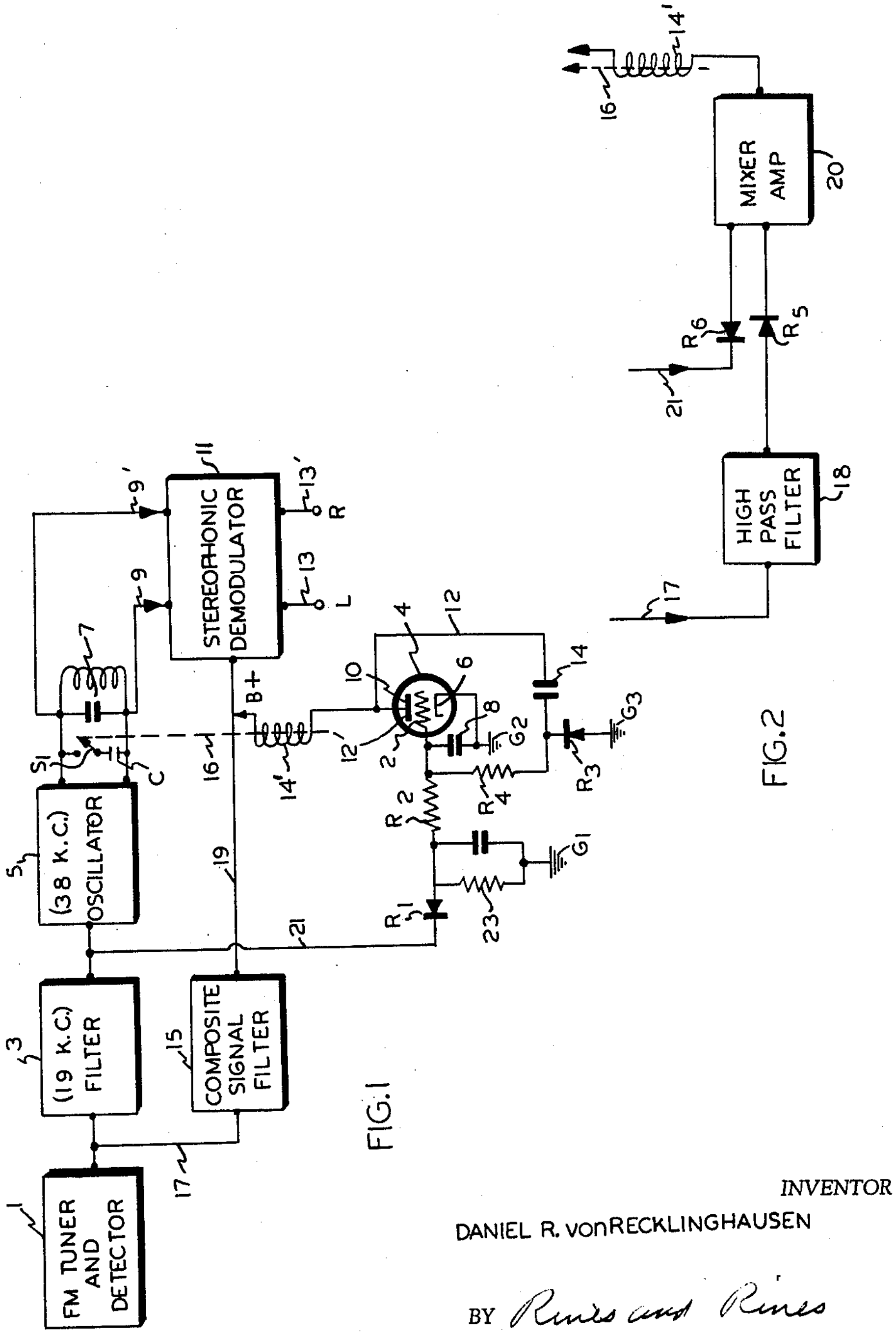

The present invention relates to apparatus for converting from multi-channel to single-channel broadcast reception, and, more particularly, to stereophonic broadcast transmission reception apparatus that is adapted to be converted to dual-output monophonic apparatus at the will of an operator, or automatically upon the changing at the transmitter of a stereophonic broadcast transmission to a monophonic broadcast transmission.

The conventional stereophonic broadcast transmission, as explained in my article entitled "Stereophonic FM Receivers and Adapters," appearing in the November, 1961 issue of The Institute of Radio Engineers Transactions on Broadcast and Television Receivers, Volume BTR–7, No. 3, involves a main channel containing the sum of the left and right audio signals and a subchannel containing a suppressed carrier amplitude modulated by the difference of the left and right audio signals. Both main and subchannel form the composite signal which then frequency modulates the main carrier of an FM transmitter. The suppressed subcarrier is the second harmonic of a 19 KC pilot signal, which also frequency modulates the main carrier.

An object of the present invention is to provide a novel circuit at the receiver for enabling the receiver to be converted from a stereophonic demodulating receiver that provides the appropriate stereo signals in each of the left-and right-ear outputs, to a monophonic receiver that gives a dual output of the same monophonic signals, either at the will of the operator, or automatically upon the changing of transmission at the transmitting station from stereophonic broadcasting to monophonic broadcasting.

A further object is to provide a new and improved demodulator circuit that while particularly suited to the stereophonic-to-monophonic conversion purposes above-described, is of more general utility in places where multiple-channel signals are transmitted and it is similarly desired to convert to a single-channel output in the reception process.

Other and further objects will be explained hereinafter and will be more particularly pointed out in connection with the appended claims.

In summary, from one of the broad aspects of the invention, however, the invention contemplates a novel apparatus for converting from multi-channel broadcast reception to single channel reception of the said broadcast having, in combination, a tuner for receiving and detecting a multi-channel broadcast transmission comprising a frequency-modulated carrier carrying first and second channel modulations and a pilot-frequency modulation. A filter is provided tuned to the pilot frequency and connected to the tuner for extracting the pilot frequency from the detected carrier. An oscillator is also connected to the filter for producing oscillations of predetermined frequency (corresponding to the sub-carrier in the case of stereophonic broadcast signals before-mentioned) synchronized with the pilot frequency, and demodulator means is connected with the oscillator means and the tuner so that, in the pair of outputs thereof, there will be reproduced the first and second channel modulations, with the latter resulting because of the application of the locally generated oscillations at the receiver to the demodulator means. Means is also provided, preferably under the automatic control of a circuit detecting the absence of the pilot tone, for altering the tuning of the oscillator means in order to cause its oscillations to occur at a different frequency higher not only than said predetermined frequency but also than any of the channel-modulation frequency components, thereby to provide in both of the outputs of the demodulator the first-channel modulation alone. Preferred constructional details are hereinafter set forth.

The invention will now be described in connection with the accompanying drawing, FIG. 1 of which is a combined block-and-schematic circuit diagram illustrating the invention in preferred form; and FIG. 2 is a partial circuit diagram illustrating a modification of a portion of the same circuit of FIG. 1.

Referring to FIG. 1, a conventional stereophonic-broadcast receiving FM tuner and detector is shown at 1, feeding a pilot-tone frequency filter, such as a 19-kilocycle filter 3, the output of which is fed to a local oscillator 5 for synchronously generating oscillations at a frequency corresponding to the before-mentioned 38-kilocycle sub-carrier. In the output tuned circuit 7 of the oscillator 5, there is provided a pair of push-pull connections 9 and 9' for reinserting this sub-carrier frequency into the stereophonic demodulator 11, as shown, for example, in FIGURE 7 of my said article. As set forth in the article, the composite signal from the tuner and detector 1 is fed along conductor 17 through a composite signal filter 15 and along a further conductor 19 to the stereophonic demodulator 11. The left and right audio signals are reproduced in the outputs 13 and 13', respectively, demodulation of the subchannel signal resulting from the reinsertion of the 38 kc. subcarrier, as described in my article.

Let it now be assumed that it is desired to convert the receiver to a device that will provide at both of the outputs 13 and 13', in the output channels L and R, only one of the channel modulations, so that the system is reproducing only a monophonic dual output. This may occur, for example, when the broadcast transmitting station has changed from stereophonic broadcasting to monophonic broadcasting. Such conversion may be effected, in the preferred embodiment of the invention, through the opening of the switch $S_1$ upon the advent of this change in the broadcasting transmissions, thereby, for example, to remove a further capacitance element C, from the tuned circuit 7, de-tuning the oscillator 5 to a different frequency well above the highest frequency of interest; that is, well above the 38-kilocycle reinsert sub-carrier frequency and the modulation frequency components contained in the side-bands thereof. As a practical illustration, this different frequency would be above 68 kilocycles, for the values above-given. Under such circumstances, the appropriate reinsert sub-carrier necessary to demodulate the second or sub-channel modulation is not fed to the stereophonic demodulator 11, so that the main channel monophonic signal only, as fed from the composite filter signal output along conductor 19 into the stereophonic demodulator 11, will appear in the pair of outputs 13 and 13' as in FIGURE 7 of my said article, for example.

While the switch $S_1$ could be manually operated, in accordance with a further feature of the invention, it is preferably automatically operated to insert the capacitor C, or other element, upon the changing of the actual broadcast from the transmitting station from a monophonic to a stereophonic transmission, or vice versa. This change is detected in the system of FIG. 1 by a circuit that responds to the presence of the 19-kilocycle pilot tone output from the filter 3. That output is shown fed, also, by conductor 21 to a first series-connected rectifier $R_1$, followed by a shunt-connected by-pass network 23, grounded at $G_1$, and the time constant of which is adjusted so that it does not affect the noise or other amplitude-modulation components that exist in the output of the 19-kilocycle filter 3. The term "ground" as used herein is intended to connote not only actual earthing, but also chassis or other reference potential, as well.

A direct-current component of that output of the filter 3 is thus fed to a first mixing resistor $R_2$. This direct-current component is further fed to the input or control electrode 2 of a phase-invertor relay, shown as a vacuum or electron tube amplifier 4, the cathode 6 of which is returned to ground at $G_2$, with an appropriate bypass capacitor 8 connected between the control electrode 2 and the ground terminal $G_2$. At the output, plate or anode electrode 10 of the relay 4, an inverted signal is fed along conductor 12, through coupling capacitor 14, to a negative peak detecting rectifier $R_3$, shown shunt-connected to the ground terminal $G_3$. The resulting detected peaks of the negative components of whatever noise or other amplitude modulation may exist at the output of the filter 3, is fed, in opposite polarity to the previously described direct-current component fed to the mixing resistor $R_2$, to a further mixing resistor $R_4$ that, in turn, connects to the control electrode 2 of the relay 4. The result of this mixing at $R_2$ and $R_4$ produces at the anode 10 of the relay 4, an output that is proportional to the negative peak components or zero-crossing points of whatever amplitude modulation exists in the output of the filter 3. One is thus sure that even for a high-gain tuner, the presence of an output at 10 indicates the absence of the 19-kilocycle tone, and thus the absence of the stereophonic broadcasting, which, in the absence of the circuit 2–$R_3$–$R_4$, etc., would otherwise be falsely indicated to be present merely by the presence of noise alone in the output of the filter 3.

The presence of such an output signal at the anode or plate 10 of the relay 10 will therefore provide a control signal that may be fed along the output conductor 12′ to the winding 14′ of an electromagnetic or other switching relay, the armature 16 of which is shown dotted and connected to control the operation of the switch $S_1$. An automatic and fool-proof indication of the failure to receive the 19-kilocycle pilot frequency and, thus, of the conversion of the radio broadcasting transmissions from stereophonic to monophonic transmissions, is provided, with the receiver automatically being adapted to produce a dual-output monophonic signal. Obviously, a single-output monophonic signal may be produced, if desired.

In the circuit of FIG. 2, a modified control-signal-producing circuit is shown connected with the corresponding conductors 17 and 21, referred to in connection with the embodiment of FIG. 1. In this particular case, the composite signal from the tuner and detector 1 is fed along conductor 17 through a high-pass filter 18 and thence to a first rectifier $R_5$ that, in turn, feeds a mixer amplifier 20. Into the mixer amplifier 20, is also fed the output of the 19-kilocycle filter 3, fed along conductor 21 through an oppositely poled rectifier $R_6$. There will thus be produced in the mixer 20, for the polarity shown, a negative direct-current voltage representing the output of the 19-kilocycle pilot-tone filter 3, and a positive direct-current voltage resulting from rectification at $R_5$ of the composite signal that has been fed through the high-pass filter 18, which should be provided with a cut-off frequency that is very much higher than the highest modulation frequency of interest; that is, above about 75 kilocycles for the type of broadcasting before-mentioned. There will thus result in the output of the mixer amplifier 20, a signal that is indicative of the transition of the broadcast transmissions from stereophonic to monophonic transmissions. The resulting control signal in the output of the mixer amplifier 20 may operate the relay 4′ to open the switch $S_1$ in the very manner above-described in connection with the embodiment of FIG. 1.

Additional advantages of the circuits above-described reside in the noise improvement obtained by automatic insensitiveness to noise components occurring in the second channel frequency region during monophonic broadcasting and the switching thereto, and in the possibility of pre-setting permissible signal-to-noise ratios for switching from stereophonic to monophonic signals.

Clearly, the oscillator 5 need not be of the preferred push-pull variety, but may be single-ended. The output of the relay 4 or mixer 20, FIG. 2, moreover, may feed its control signal to other types of indicators than the switch $S_1$, including audible buzzers or visible lamps or indicators.

Further modifications will also occur to those skilled in the art and all such are considered to fall within the spirit and scope of the invention as defined in the appended claims.

What is claimed is:

1. Apparatus for converting from multi-channel broadcast reception to single-channel broadcast reception having, in combination, a tuner for receiving and detecting a multi-channel broadcast transmission comprising a frequency-modulated carrier carrying first and second channel modulations and a pilot-frequency modulation, a filter tuned to the pilot frequency and connected to the tuner for extracting the pilot frequency from the detected carrier, oscillator means connected to the filter for producing oscillations of predetermined frequency synchronized with the pilot frequency, demodulator means connected with the oscillator means and the tuner and provided with a pair of outputs for reproducing therein the first and second channel modulations, the latter as a result of the application of the said oscillations to the demodulator means, and means for altering the tuning of the oscillator means to cause its oscillations to occur at a different frequency higher not only than the said predetermined frequency but also than any of the channel modulation frequency components, thereby to provide in both of the said outputs of the demodulator means, only the first channel modulation.

2. Apparatus as claimed in claim 1 and in which the second channel modulation is carried upon a sub-carrier of frequency corresponding to the said predetermined frequency, and the said different frequency is of value higher than the combination of the said sub-carrier frequency and its second channel moduation frequencies.

3. Apparatus as claimed in claim 2 and in which the said predetermined frequency is substantially 38 kilocycles, and the said different frequency is in excess of substantially 68 kilocycles.

4. Apparatus as claimed in claim 2 and in which the first and second channel modulations are stereophonic signals respectively frequency-modulated upon the said carrier and modulated upon the said sub-carrier.

5. Apparatus as claimed in claim 1 and in which the last-named means comprises a circuit connected to the filter and responsive to the presence of the pilot frequency for producing a control signal upon the loss of the pilot frequency, and means controlled by the said control signal for operating the said tuning-altering means.

6. Apparatus as claimed in claim 5 and in which the said circuit comprises a first rectifying circuit for producing a direct-current component of the output of the said filter, a further inverting and rectifying circuit for producing opposite-polarity detected negative peak components of any amplitude modulation inherently resulting in the said filter output, and a mixing circuit for combining the said components to produce a control signal proportional to the said negative peak components.

7. Apparatus as claimed in claim 6 and in which the said tuning-altering means comprises a further electrical component and means responsive to the said control signal for introducing and removing the said component to and from the said oscillator means.

8. Apparatus as claimed in claim 7 and in which the control signal-responsive means comprises a relay connected to the said mixing circuit and provided with means for switching the said further electric component in and out of circuit in the said oscillator means.

9. Apparatus as claimed in claim 1 and in which the last-named means comprises a first rectifying circuit connected with the said filter for producing a direct-current voltage component of the output thereof, a further rectifying circuit connected with the tuner for producing a direct-current voltage component of the output thereof, and means for mixing the components to derive a control signal therefrom.

10. Apparatus as claimed in claim 9 and in which the said tuning-altering means comprises a further electrical component and means responsive to the said control signal for introducing and removing the said component to and from the said oscillator means.

11. Apparatus as claimed in claim 10 and in which the control signal-responsive means comprises a relay connected to the said mixing circuit and provided with means for switching the said further electric component in and out of circuit in the said oscillator means.

References Cited in the file of this patent

UNITED STATES PATENTS 3,069,505 Collins ---------------- Dec. 18, 1962